Jan. 17, 1933.  L. MAWER  1,894,382

CAM AND LIKE GRINDING MACHINE

Filed April 30, 1930

L. Mawer
INVENTOR

By: Marks & Clerk
ATTYS

Patented Jan. 17, 1933

1,894,382

UNITED STATES PATENT OFFICE

LLYWELYN MAWER, OF BISHOPSTON, BRISTOL, ENGLAND, ASSIGNOR OF ONE-HALF TO THE CHURCHILL MACHINE TOOL COMPANY LIMITED, OF MANCHESTER, ENGLAND, A BRITISH COMPANY

CAM AND LIKE GRINDING MACHINE

Application filed April 30, 1930, Serial No. 448,732, and in Great Britain November 18, 1929.

This invention relates to machines for the grinding or milling of cams (such as are used in internal combustion and like engines) and other irregular shaped articles.

The principal object of the present invention is to ensure that notwithstanding swinging movements of the head of the machine carrying the cam or like workpiece during the grinding or milling operation, the drive to the workpiece shall rotate the same with a uniform angular velocity. A further object of the invention is to provide means for ensuring that the reaction of the braking device usually associated with the drive to the workpiece for ensuring a steady drive shall not affect the said swinging movements of the work carrying head.

My invention comprises the combination with the spindle about the axis of which the workpiece is rotated, and which is capable of movement away from and towards the grinding wheel or milling cutter, of driving means for the workpiece also adapted to turn about said axis, and means constituting a parallel linkage system for regulating the movement of the driving means relatively to the spindle during the swinging movements of the latter.

My invention further comprises the arrangement wherein the brake applied to the drive of the spindle by which the workpiece is rotated, has its reaction borne by the machine through the frame of the spindle driving means and the linkage system.

Referring to the accompanying sheet of explanatory drawings:—

The same reference letters in the different views indicate the same parts.

The swinging head $a$ is carried by its trunnions $b$ in the bed $c$ of the machine in the known manner. The work spindle $d$ is mounted in bearings in brackets upon the head $a$ and carries thereon a master cam $e$ and a work driving plate $f$. The workpiece is mounted between the centres $g$ and $h$ or may be mounted in a chuck upon the end of the spindle $d$. The swinging head $a$ has a weight (not shown) acting thereon to hold the master cam $e$ in contact with a roller $i$ in a bracket $j$ upon the bed $c$ of the machine, so that as the spindle $d$ is rotated, a swinging movement is imparted to the head $a$.

Upon the spindle $d$ is keyed a spur wheel $j$ which has extended bosses to carry the frame $k$ through the medium of the ball bearings $m$. The wheel $j$ is rotated by the pinion $n$ on the shaft $o$ with the pulley $p$ thereon. The frame $k$ has a lug $q$ to which one end of a link $r$ is pivotally attached, the other end of the link being pivotally attached to the machine bed.

Figure 1:
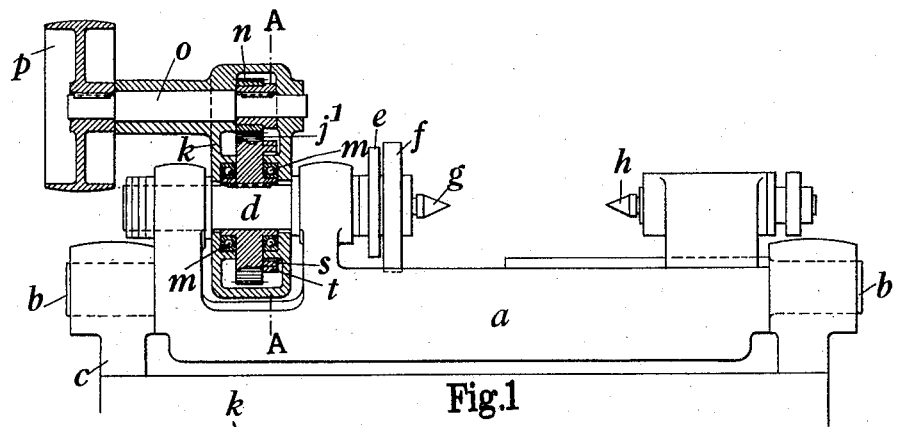
Figure 1 is an elevation with the work spindle driving gear in section showing the swinging head of a grinding machine arranged in accordance with my invention.
Figure 4:
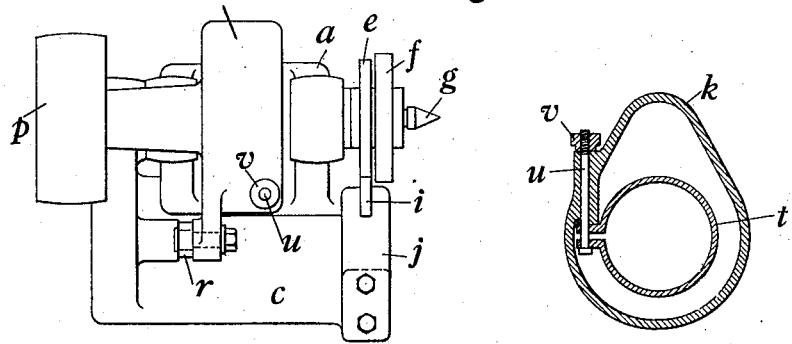
Figure 4 is a plan view of the parts.
Figure 3:
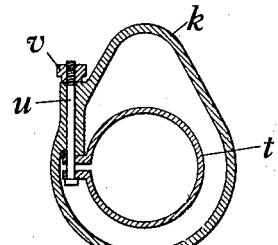
Figure 3 is a sectional end view on the line A A of Figure 1.
Figure 2:
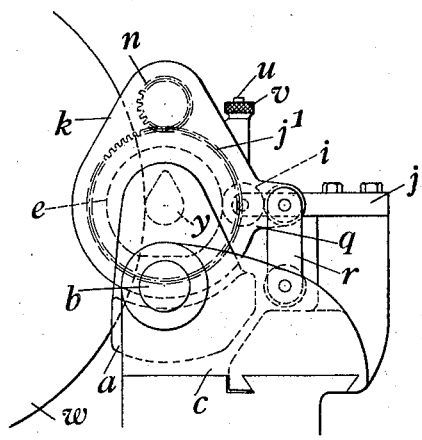
Figure 2 is an end view of the swinging head upon the machine bed.

The wheel $j$ has a projecting ring $s$ thereon upon which a brake band $t$ can be contracted by the bolt $u$ and knurled nut $v$, see Figure 3. The bolt passes through the frame $k$ as shown, and the reaction of the brake is transmitted to the frame by the nut $v$.

Figure 5:
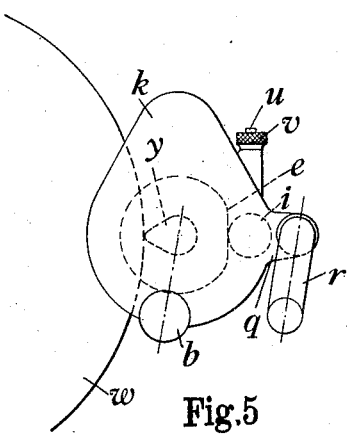
Figure 5 is a diagram illustrating the action of the parallel linkage system when the swinging head is displaced.

The distance between the centres of the pivots at the ends of the link $r$ is the same as the distance between the axis of the spindle $d$ and the axis of the trunnions $b$. Also when the axis of $d$ is vertically above the axis of $b$ the link $r$ is vertical. The arrangement therefore constitutes a parallel linkage system as will be appreciated from the diagrammatic representation in Figure 5, where the grinding wheel $w$ is shown acting upon the nose of a cam $y$. The swinging movement of the head $a$ does not therefore affect the drive within the frame $k$ so that the angular rate of rotation of the workpiece does not vary during such movement.

As the reaction of the brake $t$ is borne through the frame $k$ and the linkage system by the bed of the machine, the brake does not exert any restraint upon the free swinging movements of the head $a$.

What I claim is:—

1. In cam and like grinding and milling machines, the combination of a grinding wheel, a work spindle, a machine bed, a swinging head mounted on said bed, trunnions for said swinging head, a gear driving and rotating upon the same axis as said work spindle, a frame mounted on said swinging head and housing said gear, a lug on said frame, a pinion carried by said frame and driving said driving gear, a link one end of which is pivotally connected to said lug and the other end to said machine bed, the distance between the pivots of said link being equal to the distance between the axis of said trunnions and the axis of said driving gear and constituting a parallel linkage system which together with the fact that said pinion is mounted in the same frame as said driving gear, ensures that said work spindle is rotated with uniform angular velocity.

2. In cam and like grinding and milling machines as claimed in claim 1, the combination with the driving gear of a brake ring and a brake acting upon said ring and having its reaction transmitted to the machine bed through the frame carrying the work spindle driving gear and linkage system.

In testimony whereof I have signed my name to this specification.

LLYWELYN MAWER.